(12) United States Patent
Worthington et al.

(10) Patent No.: US 9,015,441 B2
(45) Date of Patent: Apr. 21, 2015

(54) MEMORY USAGE SCANNING

(75) Inventors: Bruce L. Worthington, Redmond, WA (US); Vishal Sharda, Redmond, WA (US); Qi Zhang, Redmond, WA (US); Mehmet Iyigun, Kirkland, WA (US); Yevgeniy Bak, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 760 days.

(21) Appl. No.: 12/770,937

(22) Filed: Apr. 30, 2010

(65) Prior Publication Data

US 2011/0271070 A1    Nov. 3, 2011

(51) Int. Cl.

| | |
|---|---|
| *G06F 12/00* | (2006.01) |
| *G06F 13/00* | (2006.01) |
| *G06F 13/28* | (2006.01) |
| *G06F 9/26* | (2006.01) |
| *G06F 9/34* | (2006.01) |
| *G06F 3/06* | (2006.01) |
| *G06F 12/10* | (2006.01) |

(Continued)

(52) U.S. Cl.
CPC .......... *G06F 3/0625* (2013.01); *G06F 12/1009* (2013.01); *G06F 1/3268* (2013.01); *G06F 1/3275* (2013.01); *G06F 11/3471* (2013.01); *G06F 3/0647* (2013.01); *G06F 3/0688* (2013.01); *G06F 1/3225* (2013.01); *Y02B 60/1225* (2013.01); *G06F 2201/88* (2013.01); *Y02B 60/1246* (2013.01); *Y02B 60/165* (2013.01)

(58) Field of Classification Search
CPC . Y02B 60/1225; G06F 1/3225; G06F 1/3275; G06F 3/0647

USPC ................... 711/156, 159, 165, 202
See application file for complete search history.

(56) References Cited

U.S. PATENT DOCUMENTS

| | | | |
|---|---|---|---|
| 6,938,119 | B2 | 8/2005 | Kohn et al. |
| 6,954,837 | B2 | 10/2005 | Woo et al. |

(Continued)

FOREIGN PATENT DOCUMENTS

| | | |
|---|---|---|
| EP | 483525 A2 | 5/1992 |
| EP | 0567420 A1 | 10/1993 |

OTHER PUBLICATIONS

Lu, et al., "Operating-System Directed Power Reduction", Retrieved at << http://ieeexplore.ieee.org/stamp/stamp.jsp?tp=&arnumber=876754&isnumber=18978 >>, International Symposium on Low Power Electronics and Design, Proceedings of the 2000 international symposium on Low power electronics and design, Jul. 25-27, 2000, pp. 37-42.

(Continued)

*Primary Examiner* — Ryan Bertram
(74) *Attorney, Agent, or Firm* — Kate Drakos; John Jardine; Micky Minhas

(57) ABSTRACT

A memory scanning system may scan memory objects to determine usage frequency by scanning each memory object using a mapping of the processes stored in memory. The scanning may be performed multiple times to generate a usage history for each page or unit of memory. In some cases, scanning may be performed at different frequencies to determine multiple classifications of usage. The mapping may create a detailed topology of memory usage, including multiple classifications of access frequency, as well as several other classifications. Based on the topology, the objects in memory may be copied to another storage medium or optimized for performance or power consumption.

18 Claims, 6 Drawing Sheets

(51) Int. Cl.
*G06F 1/32* (2006.01)
*G06F 11/34* (2006.01)

(56) References Cited

U.S. PATENT DOCUMENTS

| | | |
|---|---|---|
| 7,272,734 B2 | 9/2007 | Gooding |
| 8,245,060 B2 * | 8/2012 | Worthington et al. ......... 713/320 |
| 8,402,232 B2 * | 3/2013 | Avudaiyappan et al. ..... 711/156 |
| 8,626,996 B2 * | 1/2014 | Oh et al. ....................... 711/103 |
| 2003/0217246 A1 | 11/2003 | Kubota et al. |
| 2004/0117540 A1 | 6/2004 | Hahn |
| 2005/0232192 A1 | 10/2005 | Rawson |
| 2006/0117160 A1 | 6/2006 | Jackson et al. |
| 2006/0161803 A1 | 7/2006 | Andreev et al. |
| 2006/0179334 A1 | 8/2006 | Brittain et al. |
| 2006/0248259 A1 | 11/2006 | Ryu et al. |
| 2007/0011421 A1 | 1/2007 | Huang et al. |
| 2007/0288783 A1 | 12/2007 | Ogasawara et al. |
| 2008/0320203 A1 | 12/2008 | Fitzgerald |

OTHER PUBLICATIONS

China Office Action, Aug. 14, 2013, China.
Dong Gang, Search Report, Aug. 6, 2013, China.
"Second Office Action Received in China Patent Application No. 201180021831.1", Mailed Date: May 5, 2014, 6 Pages.
"Third Office Action Received in China Patent Application No. 201180021831.1", Mailed date: Sep. 29, 2014, 6 Pages.
PCT Search Report, mailed Jan. 12, 2012, PCT/US2011/031350.
"Search Report Issued in European Patent Application No. 11777778.9", Mailed Date: Dec. 12, 2014, 7 Pages.

* cited by examiner

MEMORY USAGE SCANNING

BACKGROUND

Computer systems often have random access memory that may be used for many different purposes, including storing executable code as well as data. These items in memory often have widely different use patterns. Some of the items may be used very frequently, while other items may be used less frequently.

When the usage pattern of each item in memory is known, certain optimizations may be performed, such as moving less used memory to another type of storage, or other optimization.

SUMMARY

A memory scanning system may scan memory objects to determine usage frequency by scanning each memory object using a mapping of the processes stored in memory. The scanning may be performed multiple times to generate a usage history for each page or unit of memory. In some cases, scanning may be performed at different frequencies to determine multiple classifications of usage. The mapping may create a detailed topology of memory usage, including multiple classifications of access frequency, as well as several other classifications. Based on the topology, the objects in memory may be copied to another memory medium or optimized for performance or power consumption.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
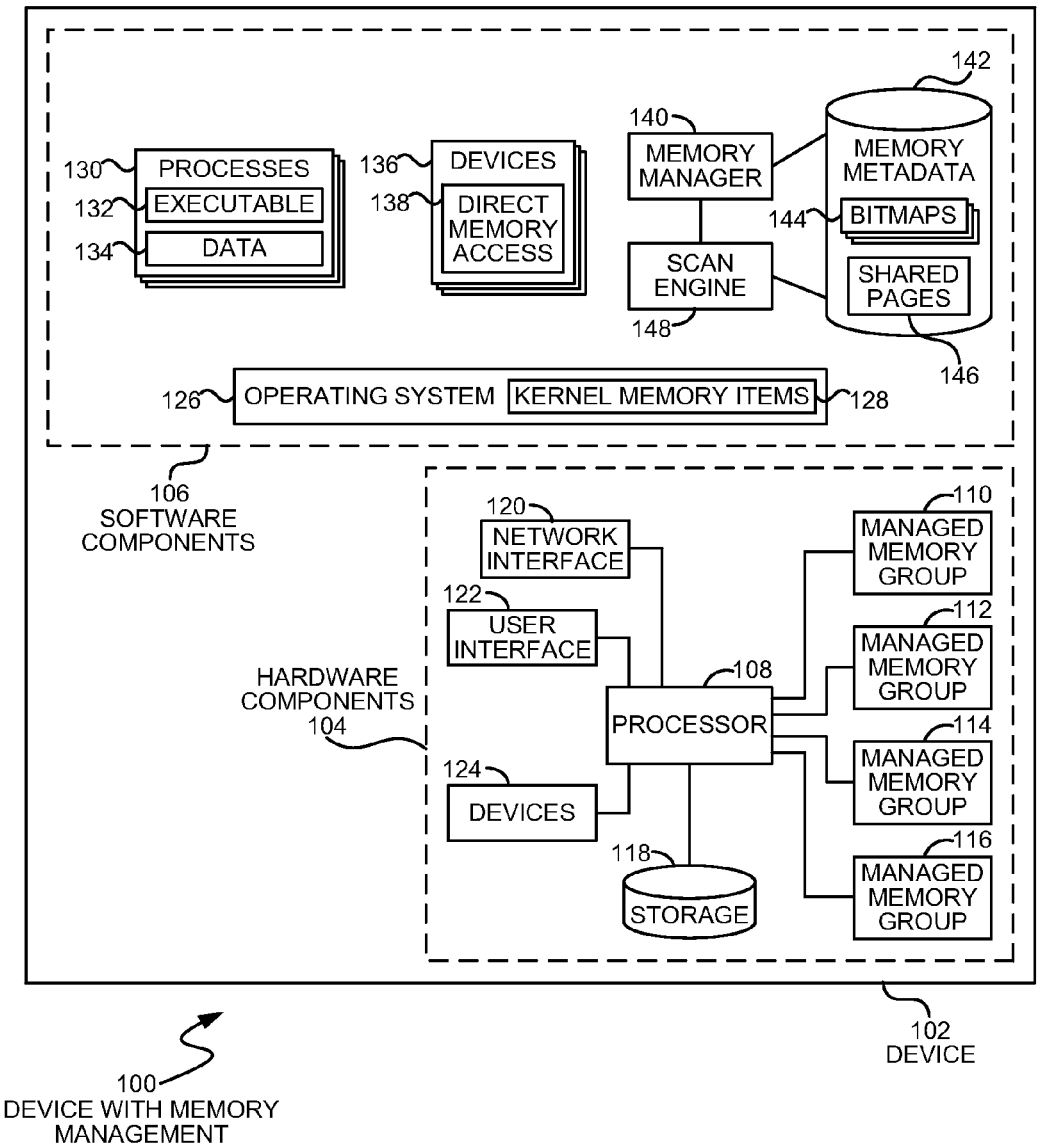
FIG. 1 is a diagram illustration of an embodiment showing a device with memory management.

A memory scanning system may be used to manage the location of items stored in memory. The memory scanning system may scan items in memory by periodically scanning metadata about the memory items to determine which memory pages have been accessed since the last scan. The periodic scanning may be used to classify the pages based on the frequency the pages were accessed over the time period of the scans, as well as other criteria.

The access frequency of the memory pages may be used to determine whether some of the memory pages may be moved to another location to optimize performance, power consumption, or other factors. Access frequency is one element of access history that can be used to determine whether memory pages may be moved.

The scanning system may create and maintain a set of bitmaps for each process that currently exists on the computer. The bitmaps may group pages into each classification so that a memory management application may quickly access pages having specific classifications.

The classifications for memory pages may include a 'heat' level that corresponds with the access frequency for each page. A 'hot' page may be accessed very frequently, a 'cold' page may be accessed infrequently, and a 'medium' page may be somewhere in between. Other classifications may also be used.

Throughout this specification and claims, the term 'memory page' is used to denote a unit of memory. The term 'memory page' may be the smallest unit of data for memory allocation performed by an operating system, and may also be the unit of data that may be moved to an auxiliary store, such as a hard disk or other nonvolatile memory location. The term 'memory page' may be different sizes of data for different applications or computer architecture.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system that may comprise a memory management system that may scan memory pages to determine a usage factor for the memory pages. Embodiment 100 is a simplified example of a system with separately managed memory regions and a scanning system for scanning the pages stored in the memory regions. Based on the usage of the objects, a memory manager may move various objects from one memory region to another to improve performance, power consumption, or other optimization.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a device that may have multiple memory regions that may be separately managed or controlled. For example, the various memory regions may be separately controlled to operate at different power levels or to deliver different performance characteristics. In some embodiments, the memory regions may be homogenous, where all of the memory regions have identical performance and operating characteristics. Other embodiments may be non-homogenous where some memory regions may have different characteristics than other regions.

A memory manager may cause memory pages to be moved from one memory region to another as part of an optimization mechanism. In some embodiments, the memory manager may optimize for performance. In another embodiment, the memory manager may optimize memory page placement for power savings.

A scan engine may scan the memory pages associated with each process to classify memory objects by usage. In a typical embodiment, the scan engine may identify usage by the frequency of access for the pages. Other embodiments may use access patterns or other criteria for usage.

Shared memory pages may be those pages that are shared among different processes. Each of the processes that shares the page may be able to read or write to the page. In some cases, one process may access the shared memory page very frequently, while another process may access the shared memory page very infrequently.

The scan engine may first analyze each process to determine how frequently the process accesses each of its associated memory pages. After performing this operation for each of the processes, the scan engine may then analyze each shared page to determine a single value for access frequency based on all of the processes that have access to the shared page. In some embodiments, the single value may then be updated for all of the processes so that the shared memory page has the same value for each process.

The device 102 may represent a conventional computer device having a set of hardware components 104 and a set of software components 106. The device 102 may have an architecture of a conventional desktop or server computer.

The device 102 may be any computer device that has a processor and memory regions that may be separately controlled. In some embodiments, a device may have multiple processors or multiple processor cores. Some embodiments may have multiple processors, each having multiple cores. In some cases, the processors may be homogenous, although in other cases, different processors may be used in a single device.

A typical device may be a server computer or desktop personal computer. Other embodiments may include portable devices such as laptop computers, netbook computers, mobile telephones, personal digital assistants, mobile scanners, or other devices. In some cases, the device 102 may be a game console, network appliance, network routing device, gateway device, or other device.

The device 102 may have a set of hardware components 104 that may include a processor 108 and several memory regions 110, 112, 114, and 116. The various memory regions may be separately managed. For example, each memory region may be independently controllable for power consumption, performance, or other factors. In some embodiments, the memory regions may be homogenous, where each memory region may be identical.

Other embodiments may be non-homogenous, where there may be two or more different devices used for random access memory. In some cases, a non-homogenous memory configuration may be created from a homogenous configuration by joining two or more memory regions into a striped or interlaced memory region. In such an embodiment, two or more memory regions may be joined together with other memory regions being single and independent.

The memory regions may vary between embodiments. In some cases, a memory region may be a single rank or memory chip. In other cases, a memory region may be a dual inline memory module (DIMM), which may contain one or more memory chips. In still other cases, a memory region may be a group of memory that contains one or more DIMMs or chips.

Each memory region may be separately controllable. For example, a memory region may be independently controllable to operate at different power levels. At a high power level, a memory region may have very fast response times, while at a lower power level, the memory region may have a latency as the memory region may be raised to a higher power state before a read or write access is performed.

In some embodiments, a hardware or software memory controller may monitor a memory region to determine if the memory region is infrequently used. For example, when a memory region has not received an access request for a predetermined amount of time, the memory controller may lower the power state so that the power consumption of the overall device may be reduced. In such an embodiment, several memory controllers may be present in a device to independently monitor and control the memory regions.

The hardware components 104 are illustrated as having four independent memory regions. Some embodiments may have many more independent memory regions, such as embodiments that may have 8, 16, 50, 100, or more independent memory regions. The number of independent memory regions may be any number of regions, provided that at least two memory regions are available and separately controllable.

The processor 108 may have access to a nonvolatile storage 118. In many systems, data stored in the random access memory regions may be periodically 'paged' or transferred to nonvolatile storage. A memory fault may occur when a request for a memory page happens when the memory page has been moved to nonvolatile storage. A memory controller may copy the memory page from the nonvolatile storage to random access memory so that the requesting program may access the memory page.

The nonvolatile storage 118 may be used to store executable and nonexecutable data for future use by the processor 108.

The hardware components 104 may also include a network interface 120 and a user interface 122.

In some embodiments, various devices 124 may have Direct Memory Access (DMA). Direct memory access is a technique where a device may be assigned a region of memory and the device may be able to read and write data to the region without involving an operating system or other software processes. Because the direct memory access may bypass much of the operating system, memory pages associated with direct memory access may not be movable by a memory manager. Examples of devices with direct memory access may include network connections, storage devices, video devices, and other peripherals.

The software components 106 may include an operating system 126 on which various applications may operate. The operating system 126 may consume memory pages with various kernel memory items 128. Kernel memory items 128 may consume memory pages that may be difficult to move or unmovable by a memory manager.

Various processes 130 may be created by applications executing on the processor 108. In some cases, a single application may launch many tens or even hundreds or thousands of individual processes. Each process 130 may consume memory pages with executables 132 and data 134. Executables 132 may include instructions that are executed by the processor 108, while the data 134 may be any other stored data used by the process 130.

Some devices 136 may consume direct memory access 138 memory pages. Such devices may be peripherals such as hard disk controllers, video display devices, input devices, or other devices. In some cases, the devices may be internal to the device 102, while in other cases, the devices may be external.

A memory manager 140 may optimize the placement of memory objects across the various memory regions 110 through 116. The memory manager 140 may perform different types of optimizations in different embodiments. In one use scenario, a memory manager may consolidate infrequently used memory pages onto one or more memory regions so that those memory regions may be operated at a reduced power. In another use scenario, the memory manager may consolidate frequently used memory pages onto an interleaved memory region to increase performance of the device 102.

The memory manager 140 may identify and move various memory pages by analyzing memory metadata 142. The memory metadata 142 may include various bitmaps 144 and data on shared memory pages 146.

A scan engine 148 may perform various scans of the memory to create the memory metadata 142 that may be consumed by the memory manager. The scan engine 148 may perform repeated scans of the memory pages to identify how frequently individual memory pages are accessed. Several examples of the operations of a scan engine are presented in embodiments 200, 300, 400, 500, and 600 presented later in this specification.

The scan engine 148 may scan memory pages by scanning those pages associated with processes. As part of an operating system, each process may be allocated memory and given a set of virtual addresses for the allocated memory. The process may address the memory pages using the virtual memory addresses, while a page table may map those memory pages to a physical address. Each process may have a working set list that contains the virtual addresses of the memory pages assigned to the process.

The scan engine 148 may use the working set list for each process to scan each memory page associated with the process. During the scan, the scan engine may update various bitmaps and counters for the memory pages, and then use the bitmaps and counters to determine how frequently the memory page is accessed.

A bit may be maintained within a memory device that indicates whether a memory page has been accessed. In some embodiments, a single bit may be used to indicate an access of some sort. In other embodiments, two or more bits may be used to indicate whether the access was a read access, a write access, or both. The bit or bits may be configured so that a scan engine 148 may be able to query the bit or bits, then reset the bits as part of the scan. A changed bit on the next scan may indicate that an access has occurred since the last scan. In some embodiments, the bits may be used to indicate frequency of access.

In such an embodiment, the frequency of scanning may change the resolution of the measurement of access frequency. A high frequency scan may identify a narrow range of those memory pages that are rapidly changing or accessed very often. A lower frequency scan may identify a wider set of memory pages. In some embodiments, scanning may be performed at two or more different frequencies to identify memory pages with different levels of access frequency.

Figure 2:
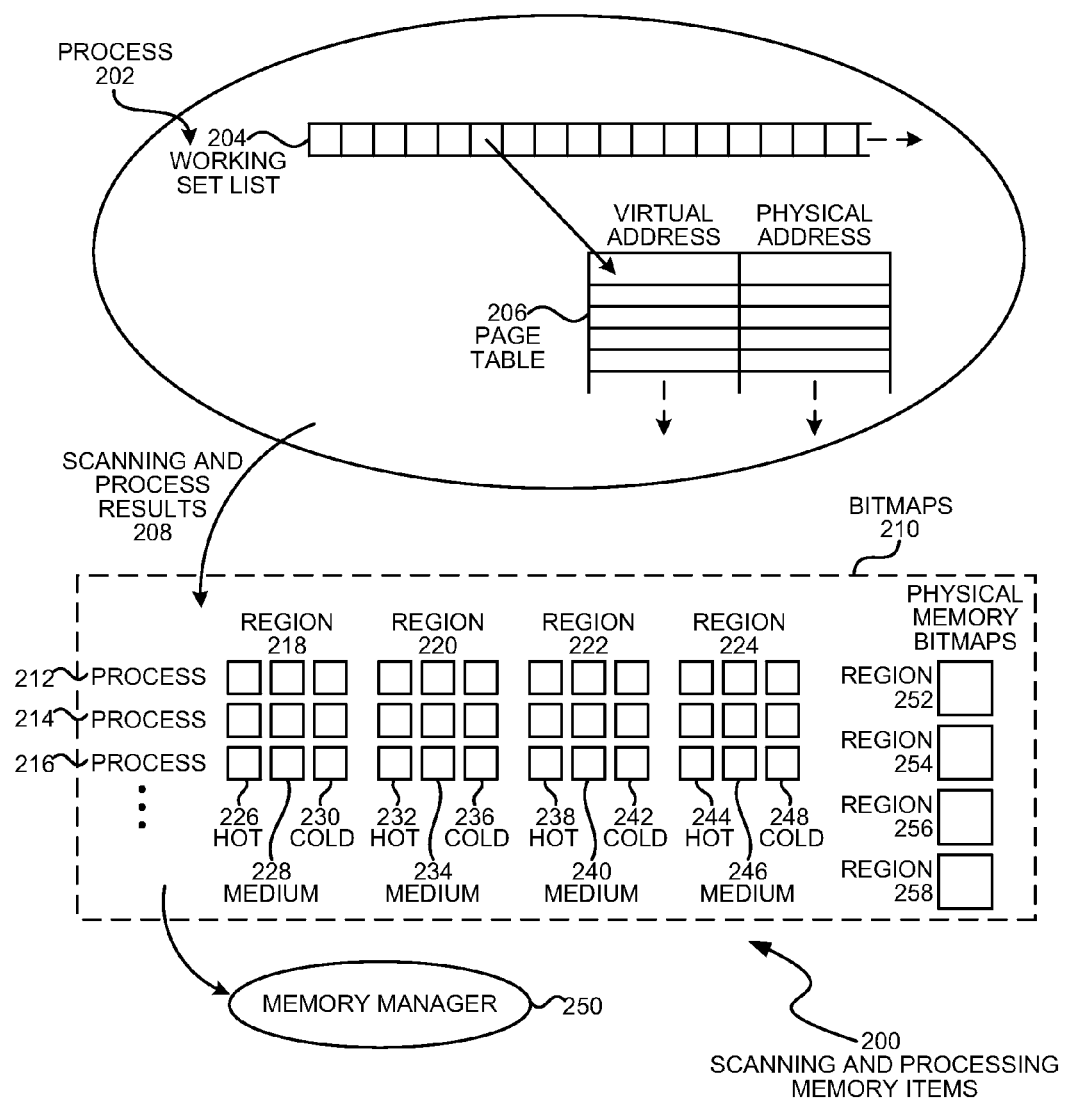
FIG. 2 is a diagram illustration of an embodiment showing a items used in scanning and processing memory pages.

FIG. 2 is a diagram illustration of an embodiment 200 showing an example of different components that may be involved in performing a memory scan. Embodiment 200 is a simplified diagram that may help illustrate how a scan engine may operate and the construction of various bitmaps that may be used in scanning and managing memory pages.

A process 202 may be allocated pages of memory. In many embodiments, a process may request memory from an operating system and the operating system may assign memory pages. In some cases, the process may make multiple requests as the process executes.

Some processes may free memory from time to time. When memory is freed from a process, the freed memory pages may be returned to the operating system and allocated to other processes when a request is received. In many cases, the operating system may wipe the memory page clean by changing all of the values in the freed memory page to zeros. Such memory pages may be known as 'free' pages prior to changing the values to zeroes, and 'zeroed' pages afterwards.

Memory pages that are assigned to a process 202 may be stored in a working set list 204. The working set list may contain a list of virtual addresses for memory pages assigned to the process 202. The items in the working set list 204 may be virtual addresses that may be resolved into physical addresses through an entry in a page table 206. The page table 206 may contain a mapping of virtual addresses to physical addresses.

When a memory page is moved from one location to another, the location of the memory page may be updated in the page table 206. This may allow the memory pages to be moved without affecting the working set list 204 and thus the physical changes to the memory page may not affect the operation of the process 202. In some embodiments, contents of a bitmap associated with the memory page may be transferred to a new location as well.

The operations of scanning and processing results 208 may produce a set of bitmaps 210. Several examples of processes that may be used to generate bitmaps 210 are illustrated in embodiments 300, 400, and 500 presented later in this specification.

The bitmaps 210 illustrated in embodiment 200 are merely one mechanism by which the classifications of the memory pages may be gathered and stored. The bitmaps 210 may be created so that a memory manager 250 may efficiently gather certain types of memory pages in order to perform some optimizations.

The bitmaps 210 illustrate an example embodiment where each process 212, 214, and 216 has a set of bitmaps. Within each set of bitmaps for each process, another set of bitmaps may be created for each memory region 218, 220, 222, and 224. Within each region, separate bitmaps may be created for memory pages that are hot, medium, or cold.

In the example of embodiment 200, region 218 may contain a vertical column of bitmaps for hot 226, medium 228, and cold 230. Region 220 may contain columns of bitmaps for hot 232, medium 234, and cold 236. Similarly, regions 222 and 224 may contain columns of bitmaps for hot 238 and 244, medium 240 and 246, and cold 242 and 248, respectively.

For each of the processes 212, 214, and 216, the bitmaps may have the same number of entries corresponding to the respective working set list for each process. Within the bitmap, an entry in the corresponding position of the bitmap may indicate that a memory page is located in the bitmap's designated location. For example, an entry in the third column of the medium bitmap for process 212 under region 220 may indicate that the third memory page from the working set list is stored in region 220 and has a medium classification.

The illustrated configuration of bitmaps is useful in that a memory manager 250 may gather all of the hot, medium, or cold memory pages from a specific region to perform an action, such as to move those memory pages to another region.

The bitmaps illustrated may have single bit entries in each bitmap. Other embodiments may have two, three, or more bits allocated for each entry and may represent many different types of data in a single bitmap or table.

The illustrated configuration shows three classifications of memory pages: high, medium, and low. Many embodiments may operate with high and low classifications and may not include medium. Other embodiments may include several additional classifications. In some embodiments, a first set of bitmaps may be created for read access classifications and a second set of bitmaps may be created for write access classifications.

The bitmaps 210 may include physical memory bitmaps for the various regions. The physical memory bitmaps 252, 254, 256, and 258 may represent the composition of each physical memory region. In many cases, the physical memory bitmaps 252, 254, 256, and 258 may have entries that indicate multiple classifications.

The physical memory bitmaps may include entries that indicate whether a memory page is hot, medium, or cold, and may also include classifications for shared memory pages, as well as free pages, zeroed pages, unscannable pages, unmovable pages, direct memory access buffers, kernel structures, private and shared pages, system pages, and other classifications. In some embodiments, some such classifications may be included in the process-specific bitmaps where applicable.

The physical memory bitmaps may be used by a memory manager 250 to quickly analyze the state of the various memory regions and determine whether and how the memory regions may be reconfigured. For example, a memory manager 250 may analyze a physical memory bitmap to determine a ratio of hot memory pages to cold memory pages. Based on the ratio, the memory manager 250 may elect to move either the hot or cold memory pages to another memory region, for example.

Figure 3:
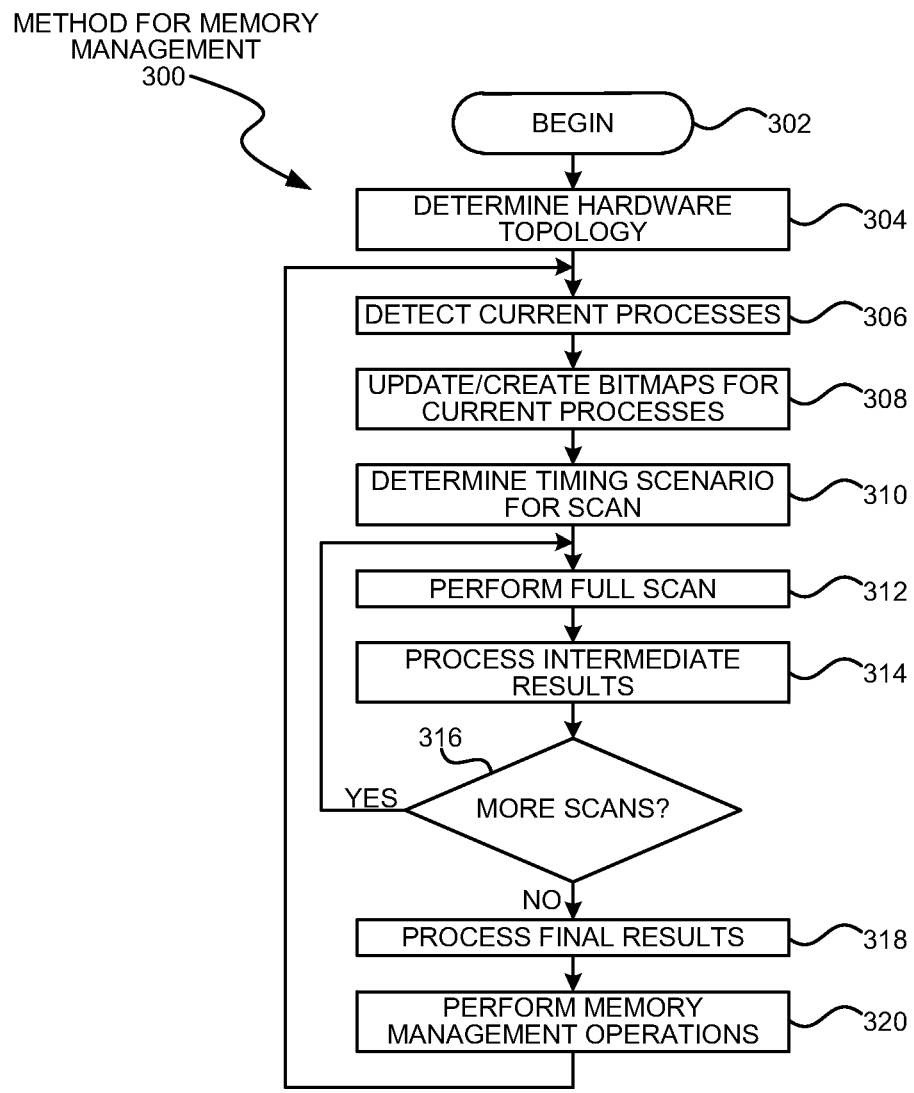
FIG. 3 is a flowchart illustration of an embodiment showing a method for memory management.

FIG. 3 is a flowchart illustration of an embodiment 300 showing a general method for scanning memory objects so that memory optimization may be performed. Embodiment 300 is a simplified example of a general method that may be performed by a memory manager and scan engine as part of an optimization process. Detailed examples of some of the portions of embodiment 300 are presented in embodiments 400 and 500 later in this specification.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a high level process for scanning memory pages and performing memory optimization. The process may begin in block 302 when a device is bootstrapped.

A hardware topology may be determined in block 304. The hardware topology may include metadata describing the various memory regions. The metadata may include the number of memory regions, the size of each region, physical addresses, as well as any capabilities, performance characteristics, or other information that may differentiate the regions. In many embodiments, the hardware topology may be configured prior to bootstrapping an operating system and may not be changed after the operating system is running.

In block 306, the current processes may be detected. Bitmaps representing the current processes may be updated or created in block 308 in preparation for a scan.

A timing scenario may be determined in block 310 for the scan. In many embodiments, the scan may be performed in several iterations. Many memory systems have a bit that may be set when a memory page is accessed, either by a read access or write access. The scan process may evaluate the bit and then reset the bit. When a scan detects that the bit is unset, the memory page has not been accessed since the last scan.

The access frequency of each memory page may be determined by the history of successive scans. The length of time between each scan may be determined in block 310 in order to select a broad or narrow group of memory pages to identify as accessed. A shorter length of time may identify a smaller group of memory pages, while a longer length of time may identify a larger group. In many cases, the smaller group may tend to be more volatile and may change more rapidly than the larger group that may be identified with a longer length of time between scans.

In some embodiments, the scan may be performed at several different intervals. For example, a set of longer frequency scans may be used to identify medium frequency memory pages while a set of shorter frequency scans may be used to identify high frequency memory pages. Embodiment 300 may be an example of a process where such a scan scenario may be implemented.

A full scan may be performed in block 312. An example of a full scan may be illustrated in embodiment 400.

The results of a scan may be processed in block 314. An example of a method for processing results may be illustrated in embodiment 500.

If more scans are to be performed in block 316, the process may loop back to block 312. If no more scans are to be performed in block 316, the final results may be processed in block 318. The final results may be processed in a similar manner as the intermediate results from block 314.

A memory manager may perform memory optimization in block 320 and the process may return to block 306.

Figure 4:
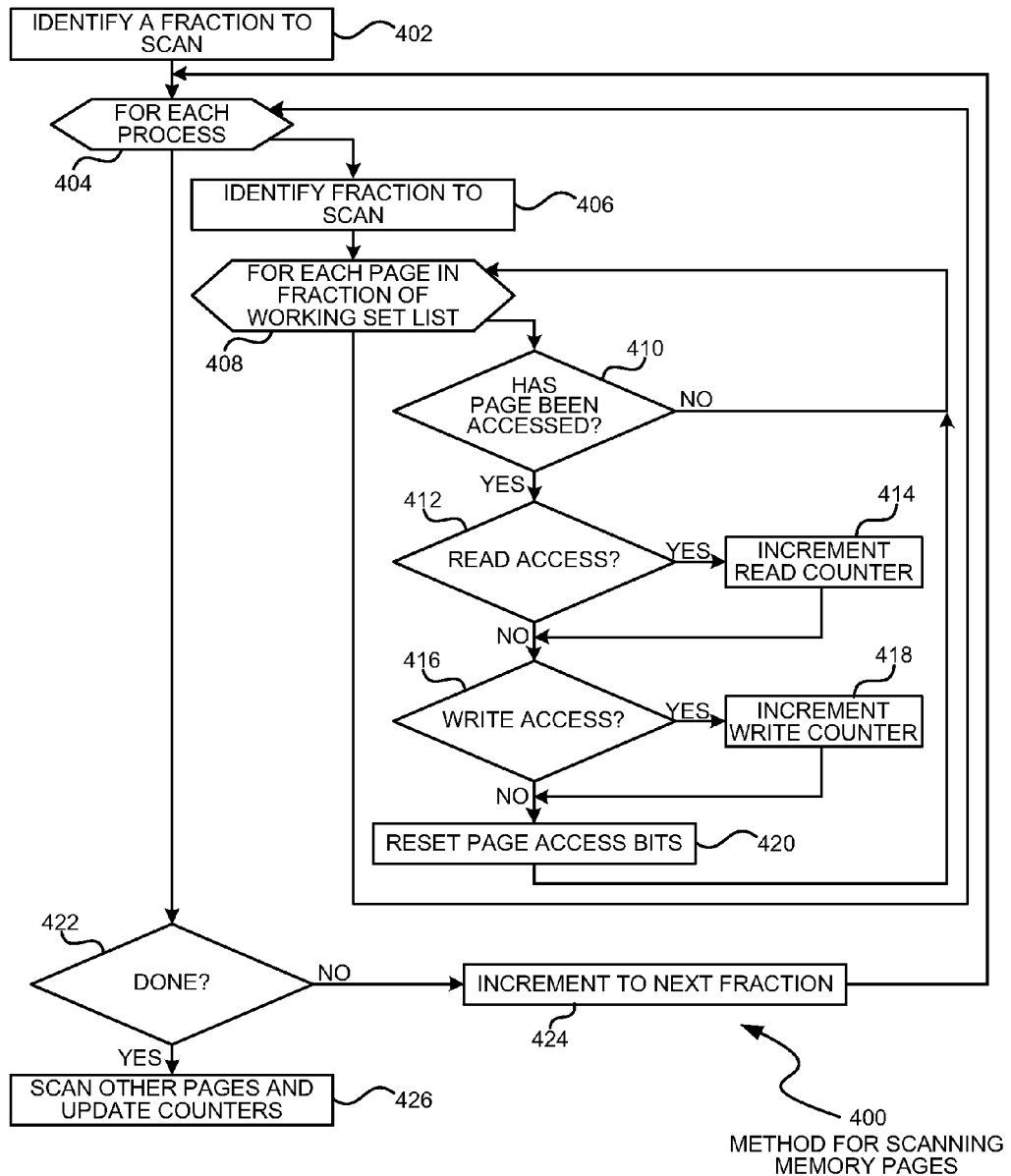
FIG. 4 is a flowchart illustration of an embodiment showing a method for scanning memory pages.

FIG. 4 is a flowchart illustration of an embodiment 400 showing a method for scanning memory objects. Embodiment 400 is an example of a full scan, such as a full scan that may be performed in block 312 of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is an example of a method that may scan a memory page for either read or write access and may keep a separate counter for read and write operations. The scanning mechanism may use a hardware or software bit or bits that may be toggled by hardware or software whenever a memory page is accessed. Some embodiments may include only a single bit that may indicate that an access occurred, but not differentiate between read and write access.

Embodiment 400 scans through the working set lists for each process and increments counters for those processes. The counters may accumulate values as repeated scans are performed. After several scans, the counters may be tallied for each memory page to classify the access frequency or usage of the memory page.

Embodiment 400 may use counters that count up for each scan where an access has occurred. In many such embodiments, several full scans may be performed in succession, and then the counters may be analyzed to identify those memory pages that are highly used, those that are lightly used, and possibly those memory pages that are used at some intermediate level. After the analysis, the counters may be reset for another analysis pass.

Other embodiments may use different tracking and counting mechanisms. For example, some embodiments may use counters that increment when a memory page has not been accessed. In some cases, a counter may be set to an initial value then decremented on each successive scan when a memory page is unused or used. The embodiment 400 is merely one mechanism that may be used to scan memory pages.

In block 402, a fraction may be defined for a partial scan. In some embodiments, the scanning process may consume some processor and memory bandwidth. In order to minimize the effects of a scan, the scan may be performed in sections, where each partial scan may operate on a predetermined fraction of the memory pages assigned to each process. For example, a fraction of $1/128$ may break the full scan into 128 partial scans.

When the partial scans are performed, there may be a delay between each partial scan. The delay may be a predetermined timer or scheduling function that limits that amount of processor or memory bandwidth that may be allocated to scanning.

Each process may be separately scanned in block 404. For the process being scanned in block 404, a fraction to scan may be identified in block 406.

The fraction may define a section of the working set list that may be scanned in block 408. For example, the scan may be configured to make 100 partial scans. The first partial scan in the example may process the first $1/100^{th}$ of the working set list. The second partial scan may process the second $1/100^{th}$ of the working set list, and so on.

Each page within the fraction of the working set list may be analyzed in block 408. In block 410, a determination is made as to whether the page has been accessed. The determination may be made by reading a hardware bit or bits that may be set when an access occurs. In the illustrated embodiment, two bits may be used, one that indicates whether the page received a read access and a second bit that indicates whether the page receives a write access. In other embodiments, a single bit may be used to indicate any access, without distinguishing between read or write access.

Embodiments that track read and write access separately may be useful in managing memory technologies that degrade over time. Some such memory technologies may degrade during write access but may not be as affected, if at all, by read access. By tracking read and write access separately, such memory technologies may be targeted for memory pages that experience heavy read access and very light write access, for example.

When a page has not been accessed in block 410, the method may return block 408 to scan another page. If the page has been accessed in block 410 and the access is a read access in block 412, a read counter may be incremented for the memory page in block 414. Each memory page may have a separate counter for read and write accesses.

Whether or not the page has received read access, if the page has received write access in block 416, a write counter may be incremented for the memory page in block 418. After analyzing the read and write bits in blocks 412 through 418, the page access bits may be reset in block 420 and another memory page may be scanned in block 408.

After scanning through each process in block 404, if the scan has not yet been completed in block 422, the scan may be advanced to the next fraction in block 424 and return to block 404 to scan through the processes again with another partial scan.

After the processes have been fully scanned in block 422, other types of pages may be scanned in block 426. For example, kernel pages, direct memory access pages, or other pages may be scanned. In some embodiments, some such pages may be considered unmovable and therefore may be ignored, since unmovable pages may not be moved by a memory manager.

Embodiment 400 may be performed several times in succession over a period of time, each time the various counters may or may not be incremented. After performing the scan a predefined number of times, the results may be analyzed. One example of how the analysis may be performed is illustrated in embodiment 500.

Figure 5:
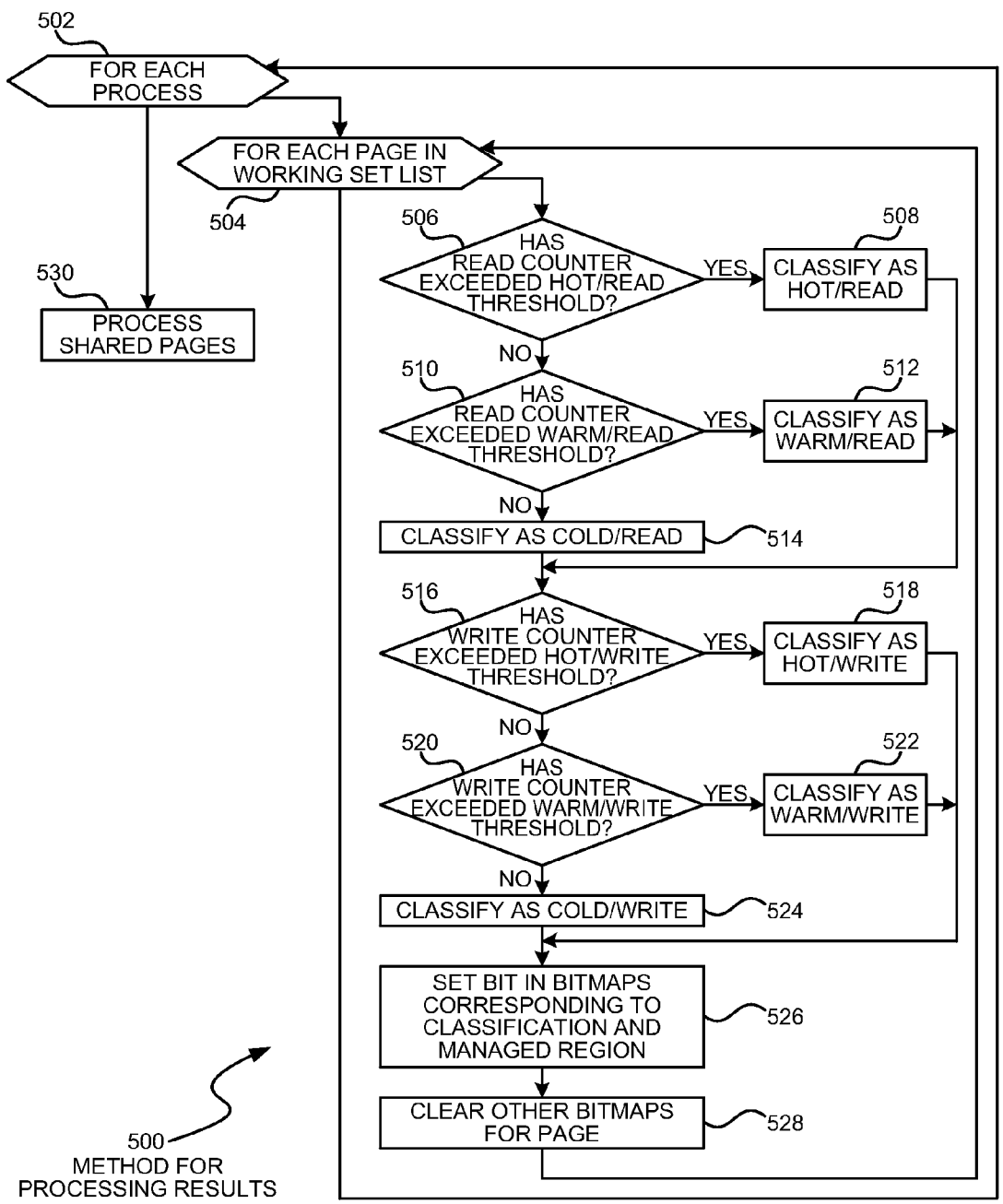
FIG. 5 is a flowchart illustration of an embodiment showing a method for processing results from a scan.

FIG. 5 is a flowchart illustration of an embodiment 500 showing a method for processing scan results. Embodiment 500 is an example of an analysis that may be performed as part of a final analysis, such as the final analysis of block 318 of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 is one example of how the results from multiple scans may be analyzed to classify a memory page, and then update the classification in a set of bitmaps. Embodiment 500 separately analyzes the read and write indicators or counters for each memory page and compares the counter value to a set of thresholds in order to classify the memory page. In the example of embodiment 500, each memory page may be assigned separate classifications for read and write activities, and within the read and write activities, the memory page may be classified as 'hot', 'medium', or 'cold'. The classifications for read and write activities may be independent or orthogonal to each other. For example, a memory page may be classified as 'hot/read' and 'medium/write'.

Embodiment 500 may use different thresholds for assigning classifications. A threshold may be defined by a minimum value for the specific classification. For example, a set of results may be calculated using ten full scans of the memory objects. In the example, a threshold for 'hot/read' may be a minimum value of eight counts. A threshold for 'medium/read' may be a minimum value of four counts. In this example, a memory page that receives a read access in between at least eight out of the ten scans may be considered 'hot/read'. Some embodiments may use the same thresholds for read and write, while others may have different threshold values for read and write accesses.

Embodiment 500 illustrates a method that analyzes memory by stepping through each process operating on a processor or core. Other embodiments may use different mechanisms for traversing the memory.

Each process may be analyzed in block 502. For each process in block 502, each page in the working set list may be analyzed in block 504.

For each page in the working set list, if the read counter has exceeded a hot/read threshold in block 506, the memory page may be classified as a hot/read page in block 508.

If the read counter has not exceeded the hot/read threshold in block 506 but does exceed the warm/read threshold in block 510, the memory page may be assigned a 'warm/read' classification in block 512. If the read counter does not exceed the warm/read threshold in block 510, the memory page may be classified as 'cold/read' in block 514.

The write counters are processed in a similar manner. If a write counter has exceeded a hot/write threshold in block 516, the memory page may be classified as 'hot/write' in block 518. If the write counter has not exceeded the hot/write threshold, but does exceed the warm/write threshold in block 520, the memory page may be classified as 'warm/write' in block 522. Otherwise, the memory page may be classified as 'cold/write' in block 524.

After classifying the memory pages, the bitmaps corresponding to the memory page may be updated in block 526. The exact process for updating the bitmaps may vary with the arrangement of the bitmaps. In the example of the bitmaps in embodiment 200, the bitmaps may be updated by identifying the physical address for the memory page to identify the memory region in which the memory page is stored. Within that region, the bitmap associated with the classification may be updated to reflect that the current memory page is present. The other bitmaps that relate to the current memory page may be cleared in block 528.

In embodiment 500, two separate sets of bitmaps may be used: one for read classifications and another set for write classifications.

After processing all of the memory pages in block 504 and all of the processes in block 502, shared memory pages may be processed in block 530. An example of how shared memory pages may be processed is illustrated in embodiment 600.

Figure 6:
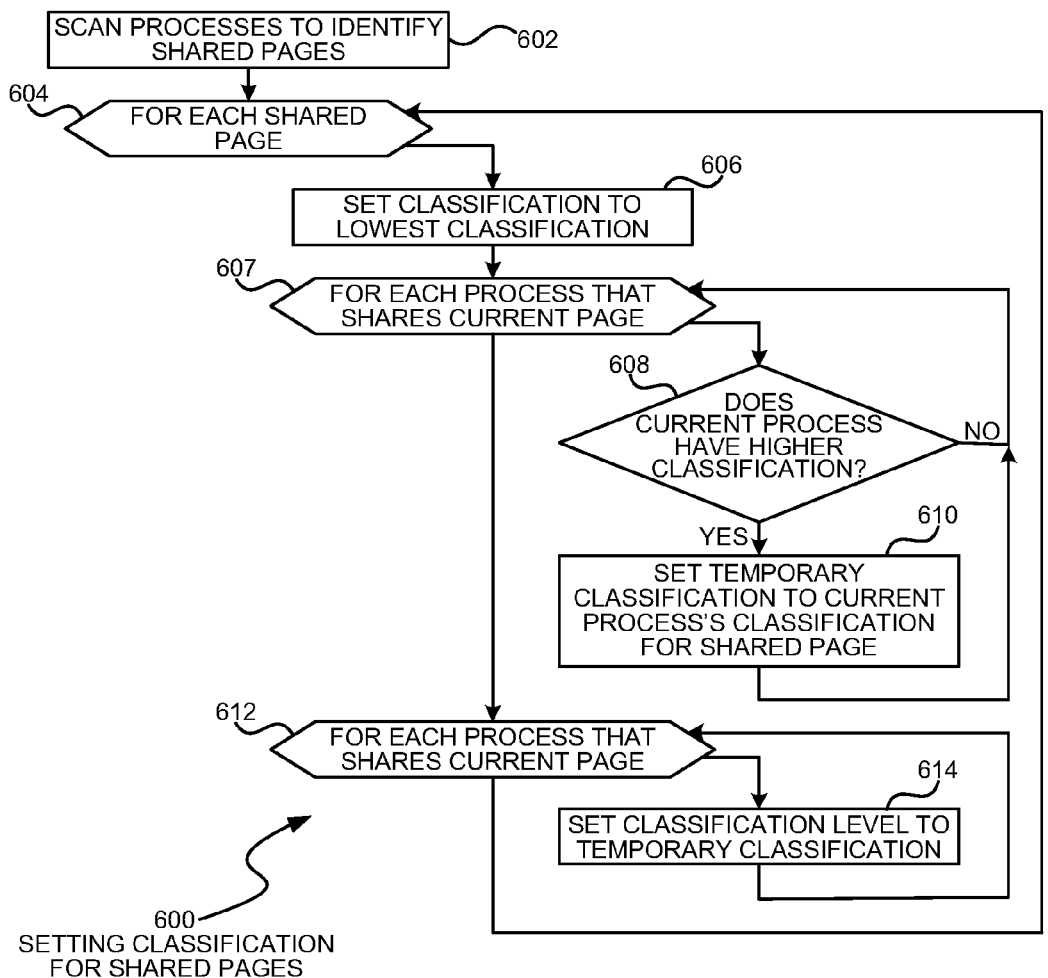
FIG. 6 is a flowchart illustration of an embodiment showing a method for processing shared memory pages.

FIG. 6 is a flowchart illustration of an embodiment 600 showing a method for processing shared memory pages. Embodiment 600 is an example of one method that may be performed by block 530 of embodiment 500.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 processes shared pages by finding the classifications determined by each of the processes that may share the page and selecting a classification. After selecting a common classification, the memory page for each process may be updated to reflect the common classification.

The process of embodiment 600 may result in the same classification being assigned to each physical memory page. In a shared memory page, two or more processes may each access the same physical memory location. During the scans and analysis of the various memory pages, the analysis may have been performed on a process by process basis. In the case where one process may be active and another process not active, a shared memory page between the processes may result in a hot classification by the first process and a cold classification by the second. In such a case, the procedure of embodiment 600 may determine a common classification and apply that classification to each process that references the memory page.

In block 602, a scan may be performed to identify all shared pages. Each shared page may be analyzed in block 604.

A temporary classification may be set to a lowest classification in block 606. For each shared process that shares the current page in block 607, the classification for the memory page assigned by the process may be analyzed in block 608. If the current process does not have a higher classification in block 608, the method may return to analyze the next process in block 607.

If the current process has a higher classification in block 608, the current or temporary classification may be set to the classification of the current process in block 610.

After each of the processes is analyzed in block 607, the temporary classification may reflect the maximum classification for any of the processes that share the memory page. In some embodiments, the maximum classification may be the 'hot' classification. In other embodiments, the maximum classification may be the 'cold' classification.

Again, each process that shares the memory page may be analyzed in block 612. For each process, the classification level for the current memory page may be overwritten in block 614 to reflect the temporary classification determined in block 610. The operations of blocks 612 and 614 may force the maximum classification to be set for each of the processes.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
   a plurality of memory regions, each being operable in at least a high power manner and a low power manner, the memory regions storing a plurality of memory pages, each memory page associated with a different process, respectively, among a plurality of processes;
   a processor operating the plurality of processes;
   a scan engine that:
      identifies said plurality of processes operating on said processor and identifies the memory pages based on the identified processes being associated therewith;
      provides sets of mappings for the processes, respectively, each set of mappings comprising subsets of mappings for the memory regions, respectively, each subset of mappings comprising maps for respective memory classifications;
      performs a plurality of scans of the identified memory pages to determine usage history classifications for each of the identified memory pages, respectively, and stores the usage history classifications in the sets of mappings; and
   a memory manager that, based on the usage history classifications in the sets of mappings, identifies at least one of said memory pages to move from a first memory region to a second memory region.

2. The system of claim 1, wherein a set of mappings comprises a set of bitmaps corresponding to each of said memory regions, said set of bitmaps comprising at least one entry for each of the memory pages.

3. The system of claim 2, wherein the set of bitmaps comprises at least one separate bitmap for each of the memory regions, respectively.

4. The system of claim 3, wherein the bitmaps contain classification designators for each of the memory pages.

5. The system of claim 3, wherein the set of bitmaps comprises a separate bitmap for each of the classification designators.

6. The system of claim 2, wherein the set of bitmaps comprises pointers to a working set list, said working set list comprising virtual addresses for said memory pages assigned to one of said processes.

7. The system of claim 1, wherein said scan engine also:
   identifies a plurality of shared pages, each of said shared pages being referenced by a set of said processes;
   for each of said shared pages, for a given shared page, determines a first classification for said given shared page based on the memory classification for said given shared page for each of said set of processes; and
   updates each of said processes in said set of processes to reflect said first classification.

8. The system of claim 7, wherein a first classification comprises a maximum classification from said classification for said shared page for each of said processes.

9. The system of claim 1, wherein some of the first classifications comprise a low frequency access category, wherein some of the first classifications comprise a medium frequency access category, and wherein some of the first classifications comprise a high frequency access category.

10. The system of claim 1, said scan engine performing a first set of scans at a first frequency and a second set of scans at a second frequency.

11. The system of claim 1, said plurality of scans being performed at a frequency less than one of a group composed of one minute, two minutes, five minutes, ten minutes, and sixty minutes.

12. The system of claim 1, said plurality of scans being performed at a frequency greater than sixty minutes.

13. A method performed for a computer processor operating a plurality of processes, said method comprising:
   determining a hardware topology comprising a plurality of memory regions, each of the memory regions being separately manageable, the memory regions storing a plurality of memory pages, each memory page assigned by a memory manager to a different one of the processes, respectively;
   detecting the plurality of processes operating on said computer processor;
   for each of said processes in the detected plurality of processes, for any given process,
      providing a set of mappings for the given process, the set of mappings comprising subsets of mappings for the memory regions, respectively, each subset of mappings comprising maps for respective usage classifications;
      identifying a given one of the memory pages as being assigned to the given process, and
      performing a plurality of scans to determine a usage classification of the given one of the memory pages, wherein a usage classification is computed for each of said memory pages that are assigned to the given one of the processes;
   moving at least one memory page from a first memory region to a second memory region based on a corresponding one of the usage classifications; and
   managing the first memory region differently than the second memory region.

14. The method of claim 13, said first memory region being operated at a different power level than said second memory region.

15. The method of claim 13, said first memory region being a higher performance memory region than said second memory region.

16. A system comprising:
   a processor operating a plurality of processes, each of said processes having at least one memory page;
   a plurality of memory regions, each being operable in at least a high power manner and a low power manner;
   for each of said plurality of processes, a set of bitmaps comprising a separate subset of bitmaps for each of said memory regions, said subset of bitmaps comprising separate bitmaps
   for each of a plurality of memory classifications;
   a scan engine that:
      performs a plurality of scans of said plurality of memory regions to identify said plurality of processes operating on said processor, each of said plurality of processes having at least one associated memory page;

determines a usage frequency classification for each of said memory pages; and stores said usage frequency classification in said set of bitmaps as part of said memory classifications;

a memory manager that identifies at least one of said memory pages to move from a first memory region to a second memory region.

17. The system of claim 16, said set of bitmaps referring to a virtual address for each of said memory pages.

18. The system of claim 17, said virtual address being a location within a working set list.

* * * * *